(12) United States Patent
Roesner et al.

(10) Patent No.: US 10,020,650 B2
(45) Date of Patent: Jul. 10, 2018

(54) BATTERY ENERGY STORAGE SYSTEM WITH ARC FLASH PROTECTION, ENERGY CONVERSION SYSTEM AND PROTECTION METHOD

(71) Applicant: GE Energy Power Conversion Technology Ltd, Warwickshire (GB)

(72) Inventors: Robert Roesner, Garching b. Munchen (DE); Christoph Rytz, Garching b. Munchen (DE)

(73) Assignee: GE ENERGY POWER CONVERSION TECHNOLOGY LTD, Rugby (GB)

( * ) Notice: Subject to any disclaimer, the term of this patent is extended or adjusted under 35 U.S.C. 154(b) by 569 days.

(21) Appl. No.: 14/628,764

(22) Filed: Feb. 23, 2015

(65) Prior Publication Data

US 2015/0244165 A1 Aug. 27, 2015

(30) Foreign Application Priority Data

Feb. 24, 2014 (DE) ........................ 10 2014 102 352

(51) Int. Cl.
*H02H 3/38* (2006.01)
*H02H 1/00* (2006.01)
(Continued)

(52) U.S. Cl.
CPC ............ *H02H 3/38* (2013.01); *H01M 10/425* (2013.01); *H01M 10/48* (2013.01);
(Continued)

(58) Field of Classification Search
CPC ...................................................... H02H 3/38
(Continued)

(56) References Cited

U.S. PATENT DOCUMENTS

| 4,086,525 A | 4/1978 | Ibsen et al. |
| 5,193,067 A | 3/1993 | Sato et al. |
| (Continued) | | |

FOREIGN PATENT DOCUMENTS

| CN | 202405763 U | 8/2012 |
| DE | 19849889 A1 | 5/2000 |
| (Continued) | | |

OTHER PUBLICATIONS

EP-2-658-064; Drawings and Entire specification.*
(Continued)

*Primary Examiner* — Dharti Patel
(74) *Attorney, Agent, or Firm* — GE Global Patent Operation; Scott R. Stanley

(57) ABSTRACT

A battery energy storage system is disclosed, the battery energy storage system comprising a rechargeable battery assembly for storing and providing energy and a protection system including an arc flash protection device to protect against risks due to arc flashes. The arc flash protection device comprises an overcurrent protection unit which detects overcurrent conditions indicating arc flash conditions in case of a low impedance of the battery assembly and an undervoltage protection unit which detects undervoltage conditions indicating arc flash conditions in case of a low impedance of the battery assembly, wherein upon detecting the overcurrent conditions and/or the undervoltage conditions for a predetermined minimum time period, the arc flash protection device initiates protective measures to prevent further operation of the battery assembly. An energy conversion system comprising such a battery energy storage system, which can be used for stationary and mobile energy supply or distribution applications, is also disclosed.

20 Claims, 3 Drawing Sheets

(51) Int. Cl.
*H02H 3/087* (2006.01)
*H02H 3/093* (2006.01)
*H02H 7/18* (2006.01)
*H02J 7/00* (2006.01)
*H01M 10/42* (2006.01)
*H01M 10/48* (2006.01)
*H02J 1/10* (2006.01)

(52) U.S. Cl.
CPC .......... *H02H 1/0015* (2013.01); *H02H 3/087* (2013.01); *H02H 3/093* (2013.01); *H02H 7/18* (2013.01); *H02J 1/108* (2013.01); *H02J 7/0026* (2013.01); *H02J 7/0029* (2013.01); *H02J 7/0083* (2013.01); *H01M 2010/4271* (2013.01); *H01M 2220/10* (2013.01); *H01M 2220/20* (2013.01); *H02J 2007/0039* (2013.01)

(58) Field of Classification Search
USPC .......................................................... 361/79
See application file for complete search history.

(56) References Cited

U.S. PATENT DOCUMENTS

| | | | |
|---|---|---|---|
| 5,307,230 A | 4/1994 | MacKenzie | |
| 5,914,586 A | 6/1999 | Fujita et al. | |
| 6,289,180 B1 * | 9/2001 | Jeng | G03B 7/16 396/206 |
| 6,359,421 B1 | 3/2002 | Mueller et al. | |
| 6,710,992 B2 | 3/2004 | Pannwitz et al. | |
| 6,888,468 B2 | 5/2005 | Bertness | |
| 7,598,708 B2 | 10/2009 | Kimura et al. | |
| 7,830,121 B2 | 11/2010 | Sasaki | |
| 8,219,333 B2 | 7/2012 | Li | |
| 2003/0156374 A1 | 8/2003 | Edwards et al. | |
| 2004/0150140 A1 * | 8/2004 | Zhan | B82Y 30/00 264/430 |
| 2004/0150410 A1 | 8/2004 | Schoepf et al. | |
| 2011/0273804 A1 | 11/2011 | Ikeuchi et al. | |
| 2012/0286591 A1 | 11/2012 | Schiemann et al. | |
| 2012/0316812 A1 | 12/2012 | Umeki et al. | |

FOREIGN PATENT DOCUMENTS

| | | |
|---|---|---|
| DE | 10032655 A1 | 1/2002 |
| DE | 10103336 C1 | 12/2002 |
| DE | 10132952 A1 | 1/2003 |
| DE | 102010004216 A1 | 7/2011 |
| DE | 102011106297 A1 | 1/2012 |
| EP | 1505706 A2 | 2/2005 |
| EP | 2393102 A2 | 12/2011 |
| EP | 2658064 A1 | 10/2013 |
| WO | 0239561 A2 | 5/2002 |
| WO | 2012155942 A3 | 6/2013 |

OTHER PUBLICATIONS

Gammon et al., "Arc Modeling Debate and Simple Incident Energy Equations for Low-Voltage Systems", Industrial and Commercial Power Systems Technical Conference, pp. 1-8, 2006.

Doan, "Arc Flash Calculations for Exposures to DC Systems", IEEE Transactions on Industry Applications, vol. No. 46, Issue No. 06, pp. 2299-2302, Nov.-Dec. 2010.

An unofficial translation of DE Office Action issued in connection with corresponding DE Application No. 102014102352.8 dated Aug. 28, 2014.

European Search Report and Opinion issued in connection with corresponding EP Application No. 15155903 dated Jul. 10, 2015.

Li et al., "Energy and Battery Management of a Plug-In Series Hybrid Electric Vehicle Using Fuzzy Logic", Vehicular Technology, IEEE, Oct. 2011, pp. 3571-3585, vol. 60 Issue:8.

* cited by examiner

BATTERY ENERGY STORAGE SYSTEM WITH ARC FLASH PROTECTION, ENERGY CONVERSION SYSTEM AND PROTECTION METHOD

FIELD OF THE INVENTION

The present invention relates to the field of battery energy storage systems and to energy systems with battery energy storage systems, in general, and to a battery energy storage system comprising an arc flash protection device, an energy conversion system with such a battery energy storage system, in particular, and to a method for the protection of these.

Increasingly, battery energy storage systems are used in many mobile and stationary applications. For example, battery energy storage systems are used in conjunction with energy supply and energy distribution systems in networks that use a share of renewable energy sources. Battery energy storages allow the balancing of energy supplies that fluctuate on account of renewable energy sources, the improvement of net stability and net quality by peak smoothing and load balancing, the shifting of renewable photovoltaic energy from day to night and/or of wind energy to low-wind times, and thus allow a reliable power supply over an extended period of time. Battery energy storage systems are widely used in battery energy storage power plants for use in the private sector, as well as in large plants with power outputs of up to several megawatts, as well as in electrical vehicles.

Battery energy storage systems and energy supply and distribution systems based thereon must be well-protected against short circuits. Due to relatively low loop impedances in electrical energy supply and distribution networks, short circuits or insulation faults may result in extremely high short circuit currents of up to several tens kA. In conjunction with this, a flashing arc—a so-called arc flash or arc fault—may form between the components of the system and can potentially lead to thermal damage of the components and can present a hazard to people, e.g., personnel maintaining the system. Therefore, work in the areas where there exists an arc flash hazard requires the wear of suitable fireproof protective clothing and the use of appropriate tools.

Indeed, various measures and fuses for the prevention of arc flashes and damage caused by them have been known. For example, suitably arranged and designed line circuit breakers and electronic fuses or cut-outs are able to interrupt current flows in a fault situation and thus avoid further damage to the plant. In essence, these measures are based on an overcurrent protection. If the detected fault current exceeds a predefined threshold, the current flow is interrupted.

It has been found that, as a result of this, a battery energy storage system cannot be fully protected against short circuit currents or fault currents. If, in particular, the internal impedance of the battery rises, the short circuit current may potentially not be strong enough to trigger the overcurrent device. The internal impedance of a battery varies within a wide range as a function of the chemical properties of the battery, its operating conditions, e.g., the temperature, the state of charge of the battery and the like. In the event of a short circuit fault in the battery or the system connected thereto, the short circuit current is a function of the internal impedance of the battery. If the strength of the short circuit current is comparable to or less than that of the nominal operating current, it is difficult or impossible to detect the fault condition with overcurrent protection. If such a short circuit condition remains undetected, this may lead to long-lasting arc flashing resulting in considerable damage to the battery system, adjacent components and may cause injury to people.

It is desirable that all of these short circuit conditions be detected and a safety switch or another such device be triggered in order to safely switch off the system. In particular, also long-lasting arc flash conditions with low short circuit currents are to be prevented in order to avoid damage to the battery energy storage system and to systems connected thereto and in order to minimize health hazards and risks to the life of people.

BRIEF DESCRIPTION OF THE INVENTION

In accordance with one aspect of the present invention a battery energy storage system having a battery assembly and a protection system for the battery assembly is provided. The battery assembly is adapted for the storage and provision of energy and is rechargeable. The protection system comprises an arc flash protection device for the protection of the battery assembly, and of people, against the hazards of arc flashing. The arc flash protection device is configured for sensing a battery current delivered by the battery assembly and comparing same with a predefined maximum current threshold, sensing a voltage delivered by the battery assembly and comparing same with a predefined minimum voltage threshold, and, in the event that the sensed battery current is greater than the maximum current threshold and/or the sensed battery voltage is less than the minimum voltage threshold, determining that arc flash conditions exist and initiating protective measures in order to prevent a continued operation of the battery assembly.

The invention combines an overcurrent protection with an undervoltage protection in order to detect different short circuit conditions and other fault current conditions and to avoid or prevent arc flash conditions. If a battery current characterizing a maximum permissible battery current in a fault situation or short circuit situation is exceeded, the arc flash protection device ensures that the battery current flow is interrupted and thus the respective short circuit current or fault current is selectively switched off. In addition, the arc flash protection device detects unusually low voltage levels of the battery voltage. If the battery voltage is below a predefined minimum voltage threshold that is a certain amount below a minimum battery voltage required or permissible for a normal battery mode, the arc flash protection device detects a fault and triggers suitable protection devices to prevent or avoid even long-lasting arc flashes exhibiting low current strength. These might otherwise not be detected by the overcurrent protection device and result in the damage of the battery system or adjacent devices, and jeopardize the health and life of people. Thus, a basis for a safe and reliable operation of a battery energy storage system covering a wide spectrum is provided. The energy introduced in a fault situation can be reduced to a relatively non-dangerous level, thus reducing the effort and costs for maintenance. The battery energy storage system comprising the inventive arc flash protection device can be used in all types of battery applications, in stationary application in the multi-MWh range, and in mobile applications such as, e.g., electrical vehicles, or the like.

The battery assembly may comprise at least one battery module formed by several battery cells that are connected in series in order to provide a minimum nominal DC voltage. Considering different embodiments, this may be at least 450 Volt and up to 600 Volt or more, as required.

One or more such battery modules may also be connected in parallel in order to achieve high nominal outputs of, e.g., at least 0.5 MW, or even 1.0 MW or more. Such battery assemblies are very suitable in conjunction with energy supply and energy distribution systems to form battery energy storage power plants for private and commercial fields of use.

The battery cells may be based on any battery technology such as, e.g., lithium-ion, lead-acid, nickel-cadmium, sodium-sulfur, sodium-nickel-chloride, or any other suitable technologies.

In one embodiment, the battery energy storage system further comprises a positive DC voltage supply line that is connected to a positive terminal of the battery assembly and comprises a negative DC voltage supply line that is connected to a negative terminal of the battery assembly, in which case the positive or the negative DC voltage supply line includes a controllable switch for the interruption of the line connection, as required. In an embodiment, the two DC voltage supply lines include appropriate switches that can be used for the galvanic separation of the battery from the connected system when arc flash conditions are detected. The controllable switches are in an embodiment internal battery contactors that may already be an integral part of a battery module.

In an embodiment, the battery energy storage system comprises a current sensor that senses the actual current delivered by the battery assembly and delivers a current signal representing the sensed actual current, and comprises a voltage sensor that senses the actual voltage currently delivered by the battery assembly and delivers a voltage signal representing the sensed actual voltage.

Furthermore, the battery energy storage system may comprise a battery management system for monitoring and controlling the rechargeable battery assembly. The battery management system may perform a multitude of functions, including that of a battery cell protection, a charge control, a load management, a determination of the state of charge of the battery, a determination of the health of the cell, a balancing of the cell voltage, and the like. In any event, the battery management system, in an embodiment, comprises a control device that determines the state of charge of the battery assembly and detects and prevents an overcharging or over-discharging of the battery assembly.

In particular, the battery management system may be connected to the current sensor and the voltage sensor that may already be an integral part of the battery module in order to receive the current signals and voltage signals from these. In that case, the control device may be adapted for comparing the voltage signal delivered by the voltage sensor with a discharge voltage limit in order to detect and prevent an over-discharged state of the battery assembly that would be discharged too deeply for a normal operation.

The discharge voltage limit is in an embodiment selected clearly greater than the minimum voltage threshold used by the protection system for arc flash protection. This voltage threshold may be selected to be at least one and a half times greater than the minimum voltage threshold. In one embodiment, in which the battery assembly exhibits a maximum voltage of approximately 600 Volt and a nominal voltage range of approximately 450 Volt to 577 Volt, the discharge voltage limit is in an embodiment within the range of 420 Volt and 450 Volt, whereas the minimum voltage threshold is within a range of 150 Volt and 300 Volt, more particularly between 200 Volt and 250 Volt.

In an embodiment, the protection system—including the arc flash protection device—is part of the battery management system. The arc flash protection device can be implemented easily and retrofitted in existing battery management systems. This is true in particular when the battery management system receives already sensed battery current signals and battery voltage signals and uses them for other control tasks such as the discharge protection.

Alternatively, the arc flash protection device may also be implemented separate from the battery management system. For example, it may be an integral part of the control or protection system of an energy system utilizing the battery energy storage system. It can then utilize the same current and voltage sensors as the battery management system, or also other sensors. It can actuate the same safety switches in a battery module as the battery management system, or actuate other safety switches included in the energy system.

In one embodiment of the invention the battery energy storage system furthermore comprises a fuse, e.g., an electronic fuse or a safety fuse, in the positive and/or negative DC voltage supply line for the interruption of the current flow by said fuse as required in the event of short circuit current of high strength.

In an embodiment, the arc flash protection device is connected to or equipped with a timer and is disposed to detect a first time duration, during which the sensed battery current is greater than the maximum current threshold, and a second time duration, during which the sensed battery voltage is smaller than the minimum voltage threshold, and to detect the arc flash conditions and initiate protective counter-measures when the first time duration is greater than a first maximum time threshold and/or the second time duration is greater than a second maximum time threshold. By taking into consideration the time factor, fault detections of arc flash conditions attributable to temporary faults can be avoided or reduced. Alternatively or additionally, the voltage and current signals can also be filtered with a filter, e.g., a low-pass filter, for this purpose.

The first maximum time threshold is in an embodiment smaller than the second maximum time threshold. Consequently, high-current arc flashing is limited to the shortest possible duration of time in order to avoid potential fire damage. Considering low-current arc flashing, the time duration of detection is greater in order to reduce any fault detections and fault shut-downs, however, still small enough to minimize any danger to system components and people. In one embodiment the first maximum time threshold is, e.g., less than 0.020 seconds, e.g., approximately 0.013 seconds, whereas the second maximum time threshold is within the range of 0.2 seconds and 1 second, more particularly at approximately 0.5 seconds.

In any event, the second maximum time threshold is smaller than a first discharge time threshold that characterizes the time duration, during which the voltage signal received by the battery management system must be lower than the discharge voltage limit in order for the battery management system to detect an over-discharged condition of the battery assembly.

In order to further improve the detection safety, the arc flash protection device may also comprise several voltage thresholds and time thresholds for undervoltage protection, in which case the smaller the voltage threshold is the smaller the time thresholds may be. In one embodiment, the arc flash protection device, for example, is disposed to compare the sensed battery voltage with a predefined first minimum voltage threshold and with a predefined second minimum voltage threshold that is smaller than the first minimum voltage threshold and, in the event that the sensed battery voltage for a first time period is smaller than the first minimum voltage threshold or that the sensed battery voltage for a second time period that is smaller than the first time period is lower than the second minimum voltage threshold, to initiate protective measures in order to prevent a further operation of the battery assembly. In the aforementioned implemented exemplary embodiment using the nominal battery voltage between 450 and 577 Volt, the first minimum voltage threshold may be, e.g., 300 Volt, and the first predefined time period may be more than 500 milliseconds, e.g., 650 milliseconds, whereas the second minimum voltage threshold, may be, e.g., 150 Volt, and the second time period may be less than 500 milliseconds, e.g., 350 milliseconds.

The battery energy storage system in accordance with the invention may form an individual system (a stand-alone system) or it may be integrated in a wind turbine, a solar power plant or the like.

In accordance with another aspect of the invention there is provided an energy conversion system with a rechargeable battery assembly for the storage and provision of energy, with a converter device that is connected to the battery assembly via a DC intermediate circuit in order to convert input-side DC voltage energy delivered by the battery assembly into output-side AC voltage energy and vice versa, and with a protection system that comprises an arc flash protection device for the protection of the energy conversion system, and of people, against the hazards of arc flashing. The arc flash protection device is adapted to sense a battery current delivered by the battery assembly and to compare it with a predefined maximum current threshold, and to sense the voltage delivered by the battery assembly and to compare it with a predefined minimum voltage threshold, and to determine, in the event that the sensed battery current is greater than the maximum current threshold and/or the sensed battery voltage is smaller than the minimum voltage threshold, that arc flash conditions exist, and to initiate protective measures in order to prevent a further operation of the battery assembly.

The energy conversion system can be used in various battery-based applications, in particular stationary applications for the supply and/or distribution of energy. To this extent, the output of the converter device can be connected, e.g., to a network, e.g., a public power supply network or a stand-alone network. The battery energy storage system can be designed to take up excess energy from the network and store it temporarily in order to make it available in times of low energy supply. The energy conversion system can also be used for mobile applications such as, e.g., for electrical automobiles, busses or trucks.

The battery assembly of the energy conversion system in an embodiment comprises several battery modules, each with several series-connected battery cells, wherein the battery modules can be connected parallel to each other to a shared DC bus to which the DC intermediate circuit is connected. As a result of this, the high nominal voltages and outputs required for energy storage power plants can be made available.

Furthermore, the energy conversion system may comprise one or more protection devices for the protection against fault currents. It may comprise a controllable switch in a positive DC voltage line that is connected to a positive terminal of the battery assembly and/or in a negative DC voltage line that is connected to a negative terminal of the battery assembly in order to make possible the interruption of the line connection, as required. The controllable switch or switches may be battery contactors that have already been integrated in a battery module of the battery assembly. Alternatively or additionally, the energy conversion system may comprise a fuse, e.g., electronic fuse or safety fuse, in the positive and/or negative DC voltage supply line for the interruption of the current flow through the latter in the event of a short circuit of high strength. Alternatively or additionally, a ground fault circuit interruptor may be provided in a ground connection between a positive or negative connecting line, by means of which the DC intermediate circuit is connected to the positive or negative DC voltage supply line, and a grounding point, e.g., a system ground or a local mass. Furthermore, in an embodiment alternative or additional means, e.g., varistors or the like, are provided for overvoltage protection on the direct-voltage side and/or on the alternating-voltage side of the converter device. Furthermore, in an embodiment circuit breakers are provided in the connecting lines of the converter device on the direct-voltage side and/or on the alternating-current side. In a fault situation or for maintenance purposes, it is possible to galvanically separate individual faulty battery modules, or the entire battery assembly, from the remaining system.

In an embodiment, a battery management system, e.g., a battery management system allocated to each battery module, can be provided for monitoring and controlling the rechargeable battery assembly, said system comprising a control device for determining the state of charge of the battery assembly, and detecting and preventing an overcharging and over-discharging of the battery assembly.

The arc flash protection device may be part of the battery management. It may also be integrated—separately or independently—e.g., in a control or a protection system for the converter device.

Other than that, the explanations regarding the embodiments and viewpoints of the battery energy storage system are applicable, consistent with the first aspect, to the energy conversion system and its components, in particular the battery assembly and the protection system—including the arc flash protection device, the battery management system and the combined overcurrent and undervoltage protection for the prevention of arc flashing.

In accordance with yet another aspect, a method for the protection of a battery energy storage system against the hazards of arc flashes is provided, wherein the battery energy storage system comprises a rechargeable battery assembly for the storage and provision of DC voltage energy. The method comprises the following steps: sensing a battery current delivered by the battery assembly and delivering a battery current signal characterizing said current; comparing the battery current signal with a predefined maximum current threshold; sensing a battery voltage delivered by the battery assembly and delivering a battery voltage signal characterizing said voltage; comparing the battery voltage signal with a predefined minimum voltage threshold; and, in cae that the battery current signal is greater than the maximum current threshold at least for a first minimal time duration and/or the battery voltage signal is smaller than the minimum voltage threshold for at least a second minimum time duration, determining that arc flash conditions exist and initiating protective measures to prevent a further operation of the battery assembly.

Embodiments and principal points of the method of protection in accordance with the third aspect of the present invention comprise those of the battery energy storage system and of the energy conversion system in accordance with the first and second aspects, respectively, of the present invention. In order to avoid repetitions, reference is made to the explanations hereinabove.

Additional details of embodiments of the invention can be inferred from the dependent claims, the drawings as well as the related descriptions.

BRIEF DESCRIPTION OF THE DRAWINGS

Hereinafter, the invention is described in greater detail by way of the example of the exemplary embodiment with reference to the drawings. They show in FIG. 1 a block circuit diagram of a battery energy storage system in accordance with one embodiment of the present invention, in an isolated, simplified representation that has been separated from an application.

DETAILED DESCRIPTION OF THE INVENTION

Figure 1:
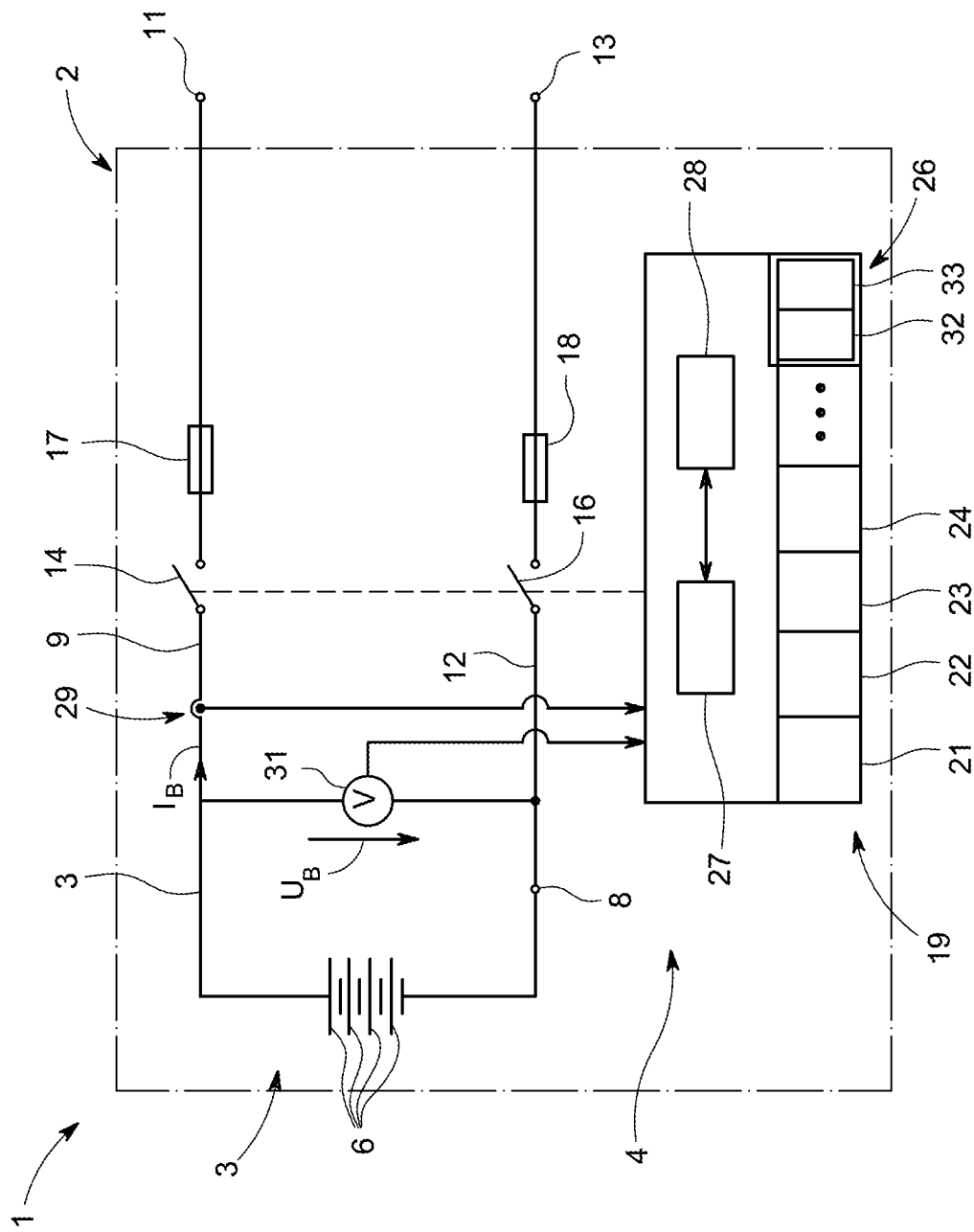

FIG. 1 shows a greatly simplified block circuit diagram of a battery energy storage system 1 in accordance with one embodiment of the invention that, here, is formed by a single battery module 2 that comprises, in a shared housing (not illustrated), a rechargeable battery assembly 3 for the storage and provision of energy, including all associate connections and associate electronics, including a battery management system 4 for monitoring and controlling the rechargeable battery assembly 3.

The battery assembly 3 comprises several series-connected battery cells 6, each exhibiting a DC voltage of, e.g., 12, 24 or 48 Volt, in which case, due to the series connection of the cells, any desirable nominal DC voltage of the battery assembly 3 can be achieved. In an application of the battery energy storage system 1 for battery energy storage power plants, the battery assembly 3 is designed for a nominal DC voltage of at least 450 Volt to approximately 600 Volt, or even higher.

The battery assembly 3 can be based on different battery technologies such as, e.g., lead-acid, lithium-iron, lithium-ion, nickel-cadmium, sodium-sulfur, sodium-nickel or any other technologies that offer the high storage capacities, energy densities, power outputs, charge speeds and low discharge behavior as are suitable for the applications intended herein.

The battery assembly 3 comprises a positive terminal 7 and a negative terminal 8. Connected to the positive battery terminal 7 is a positive DC voltage supply line 9 that leads to a positive output terminal 11 of the battery module 2. A negative DC voltage supply line 12 is connected between the negative battery terminal 8 and a negative output terminal 13 of the battery module 2.

A controllable switch 14 and 16, respectively, and a fuse 17 and 18, respectively, are arranged in the positive and the negative DC voltage supply lines 9, 12, respectively. The switches 14, 16 are in an embodiment internal battery contactors of the battery module 2 that can be activated so as to open in order to be able to interrupt—within a short time in the millisecond range—short circuit currents of up to approximately 1000 Ampere at 600 Volt battery voltage. The fuses 17, 18 are similarly intended to interrupt short circuit currents or other fault currents of higher strength up to approximately 20 kA. The fuses 17, 18 may be electronic fuses or also safety fuses. The battery contactors 14, 16 and the fuses 17, 18 belong to a protection system 19 of the battery module 2 that will be described in greater detail hereinafter.

The battery module 2 further includes a battery management system 4, this more particularly being an electronic circuit that monitors the operation and state of the rechargeable battery assembly 3. The battery management system 4, for example, is able to detect, monitor and correct any scattering of various parameters of the individual battery cells 6 due to manufacturing and aging factors, such as the capacitance and leakage currents. The battery management system 4 comprises functional units including, in particular, a battery cell protection device 21 that determines the health of the cell and ensures a final balancing of the cells, a charge control device 22 that monitors and controls the charging process of the battery assembly 3 and of the individual battery cells 6, a state of charge determination unit 23 that monitors the state of charge of the battery assembly 3 and the battery cells 6 during operation and also prevents a deep discharge or over-discharge of the latter, and a temperature management unit 24 that monitors and controls the temperature inside or in the immediate vicinity of the battery module 2. Additional functional units, e.g., for load management, for the detection and indication of operating data, for the communication with external control apparatus or devices may also be provided. All of these functional units of the battery management system 6 are part of the protection system 19 of the battery assembly 3.

Furthermore, the battery management system 4 comprises an arc flash protection device represented herein only by an additional functional block 26 and arranged to protect the battery assembly 3 as well as the system components, and persons, in the vicinity against the hazards of arc flashing. The functionality of the arc flash protection device is described in greater detail further below.

As has already been mentioned, the battery management system 4 is in an embodiment already an integral part of the battery module 2. It could be implemented strictly in the form of hardware. In a more flexible embodiment the battery management system 4 is implemented in hardware and in software and comprises a computing or processing unit 27 in the form of a microprocessor, microcontroller or the like, as well as a storage 28. The processing unit 27 is configured to execute the functions of the functional units 21-24, 26 and other functions of the battery management system 4. The associate program code can be filed, together with the associate data, parameters, etc., in the storage 28 and be retrieved from said storage for executing the functions. During operation, operating data can be stored in the storage 28 for later evaluation and for service purposes. The battery management system 4 comprises additional components that are not specifically shown here such as, e.g., a timer for a relative time detection, communication means that allow a communication with external apparatus and control devices, interfaces for the communication connection and for service purposes, and other components that support the functionality of the battery management system 4.

Furthermore, the battery management system 4 is connected to sensors or measuring devices that detect the operating and environmental parameters during an operation of the battery module 2 and deliver corresponding characterizing signals to the battery management system 4. In particular, the battery management system 4 is connected to a current sensor 29 in a communicating manner, said sensor detecting the delivered actual current $I_B$ and delivering a current signal characterizing the actual battery current. A voltage sensor 31 detects the battery voltage $U_B$ between the battery terminals 7, 8 and delivers a voltage signal characterizing the sensed actual battery voltage to the battery management system 4. The signals $U_B$, $I_B$ and additional detected sensor signals, e.g., relating to the actual temperature, are used by the respective functional units 21-24 in order to monitor and control the battery assembly 3.

During operation, the battery energy storage system 1 can be charged by an external source, e.g., a renewable energy source, this being controlled by the charge control device 22 while monitoring the battery voltage $U_B$ and the charge current $I_B$ in order to ensure an orderly charge process and avoid an overloading of the battery assembly 3. The battery cell protection device 21 ensures the monitoring of the individual battery cells 6 and, optionally, any balancing of the cell voltages.

When the battery assembly 3 is being discharged and this energy supplies a network or a consumer, the state of charge determination unit 23 uses the detected signals $U_B$, $I_B$ for monitoring the actual state of charge of the battery assembly 3 in order to detect and prevent an over-discharge of the battery assembly 3. In particular, the state of charge determination unit 23 is able to compare the actual battery voltage $U_B$ with a discharge voltage limit $U_{Blimit}$ and, in the event that the actual battery voltage $U_B$ is lower than the discharge voltage limit $U_{Blimit}$, to determine an overcharged state of the battery assembly 3. The discharge voltage limit $U_{Blimit}$ is slightly lower than the nominal voltage of the battery assembly 3 designed for the respective application. If, e.g., the battery assembly 3—when used for battery energy storage plants—exhibits a maximum voltage of approximately 600 Volt and a nominal voltage range from approximately 450 Volt to 577 Volt, the discharge voltage limit $U_{Blimit}$ is in an embodiment slightly below that, e.g., in the range between 420 Volt and 450 Volt.

In order to avoid any fault detection caused by noise, interference signals and the like, the battery management system 4 in an embodiment also detects the duration of time during which the battery output voltage $U_B$ is lower than the discharge voltage limit $U_{Blimit}$ and determines an over-discharged state of the battery assembly 3 only if the detected time duration exceeds a maximum discharge time limit $T_{limit}$. The discharge time limit $T_{limit}$ may be one second or more. When the state of charge determination unit 23 determines an over-discharged state, said unit ensures, e.g., that the battery contactors 14, 16 are opened in a controlled manner in order to avoid further discharging of the battery assembly 3.

In a similar manner, the temperature management unit 24 can discontinue an operation of the battery module 2 by opening the battery contactors 14, 16 in the event a predefined temperature of the battery module 2 exceeds a predefined maximum temperature for a longer period of time and can thus effect an over-temperature protection with the use of the protection system 19.

The protection system 19 further comprises the arc flash protection device 26 that detects and largely avoids or prevents any hazards due to arc flashes. Such arc flashes can form as a result of short circuits or insulation faults in the battery energy storage system 1 or in a system connected thereto. The arc flashes can lead to fire damage on the battery energy storage system 1 and on the system components in the environment of said battery energy storage system and present a high risk to the health and life of people nearby such as, e.g., maintenance personnel or the like. The arc flash protection device 26 in accordance with the present invention detects the presence of dangerous arc flash conditions and initiates protective measures in that it interrupts the current flow to prevent a further operation of the battery assembly 3. In order to make this possible in the most efficient manner, the arc flash protection device 26, in this case, is a combined overcurrent protection unit or logic 32 and undervoltage protection unit or logic 33.

The overcurrent protection unit or logic 32 is arranged to detect high battery currents $I_B$ that clearly exceed the nominal current range and are caused by high short circuit currents as a consequence of short circuits or insulation faults. To accomplish this, the overcurrent protection unit 32 receives the sensor signal characterizing the actual battery current $I_B$ and compares this value with a predefined maximum current threshold $I_{Bmax}$ that characterizes a permissible maximum battery current in the case of a fault. In the event that the sensed battery current $I_B$ is greater than the maximum current threshold $I_{Bmax}$ the overcurrent protection unit 32 further detects the time duration $t_1$ during which the overcurrent condition is satisfied. If the overcurrent condition for a first time duration $t_1$ is satisfied, this being greater than the first maximum time threshold $T_{max1}$, the overcurrent protection unit 32 determines that arc flash conditions are present and effects an opening of the battery contactors 14, 16 in order to prevent a current flow and a further operation of the battery assembly 3.

In the event of very high short circuit currents, the battery management system might potentially not be able to open the battery contactors 14, 16. In this case however, the fuses 17, 18 are triggered and ensure an interruption of the current flow.

It has been found that an effective arc flash protection cannot be accomplished with the overcurrent protection alone. The reason therefor is that the internal impedance of a battery varies as a function of the battery chemistry that is used and of the operating conditions such as, e.g., temperature, state of charge, age and the like. If, e.g., the battery is almost empty or its temperature is extremely low, the impedance of the battery rises. However, in the event of a fault of the battery or of a connected system, the short circuit current is a function of the internal battery impedance. Inasmuch as, with a high battery impedance, the short circuit current may be relatively low and may have a similar value as the nominal operating current, it may be potentially difficult or impossible for the overcurrent protection unit 32 to detect this fault condition and activate the overcurrent protection. This may result in long-lasting arc flashing that, despite the low current strength, may cause—over time—serious damage to the battery assembly or to the equipment connected thereto, or jeopardize the health or life of personnel. In order to avoid this, the undervoltage protection unit or logic 33 is additionally provided.

The undervoltage protection unit or logic 33 is based, among other things, on the finding that the battery voltage can suddenly drop strongly due to short-circuiting with high battery impedance, whereby this can be used for the detection of arc flash conditions with high battery impedance. The undervoltage protection unit 33 receives the sensor signal that characterizes the actual battery voltage $U_B$ and compares its actual value with a predefined minimum voltage threshold $U_{Bmin}$ that characterizes the minimum required or permissible battery voltage in the event of a fault. If the actual battery voltage $U_B$ is greater than the predefined minimum voltage threshold $U_{Bmin}$, the undervoltage protection unit 33 further detects the time duration $t_2$ during which the undervoltage condition is satisfied. If the undervoltage condition is satisfied for a time duration $t_2$ that is greater than a second maximum time threshold $T_{max2}$, the undervoltage detection unit 33 detects that arc flash conditions exist with high battery impedance and ensures that the contactors 14, 16 open and prevent the current flow and thus a further operation of the battery assembly 3.

With the combination of the overcurrent protection unit 32 and the undervoltage protection unit 33 an expansion of the operating range in which the battery energy storage system 1 can be safely and reliably operated is possible. The introduced energy in the fault situation can be reduced to minimal values, thereby reducing the risk for maintenance personnel and the like. This lowers the requirements and costs of protective measures and makes possible a more efficient and cost-effective maintenance of the battery energy storage system 1 and each system connected thereto.

For a proper, largely trouble-free and uninterrupted operation of the battery energy storage system 1, the minimum voltage threshold $U_{Bmin}$ for the undervoltage arc flash protection can be selected clearly smaller than the discharge voltage limit $U_{Blimit}$, e.g., half to one third as high as the discharge voltage limit $U_{Blimit}$. Referring to the aforementioned example using a maximum battery voltage of 600 Volt and a nominal voltage range of 450-577 Volt, the minimum voltage threshold $U_{Bmin}$ may be in the range of between, e.g., 150 Volt and 300 Volt, more particularly between 200 Volt and 250 Volt, compared with the discharge voltage limit $U_{Blimit}$ within the range of 420 Volt and 450 Volt.

Furthermore, the first maximum time threshold $T_{max1}$ for the overcurrent protection should be selected clearly smaller than the second maximum time threshold $T_{max2}$ for the undervoltage protection in order to reduce to a minimum the time duration during which the very high short circuit currents flow, without effecting too frequent and unnecessary shut-downs of the battery energy storage system 1. For example, $T_{max1}$ may be selected smaller than 0.020 seconds, more particularly be approximately 0.013 seconds, whereas $T_{max2}$ may be between 0.2 seconds and 1 second, and may more particularly be approximately 0.5 seconds. The discharge time threshold $T_{limit}$ for the over-discharge protection is clearly greater than the two other time thresholds $T_{max1}$ and $T_{max2}$ and can be at one or several seconds.

Figure 2:
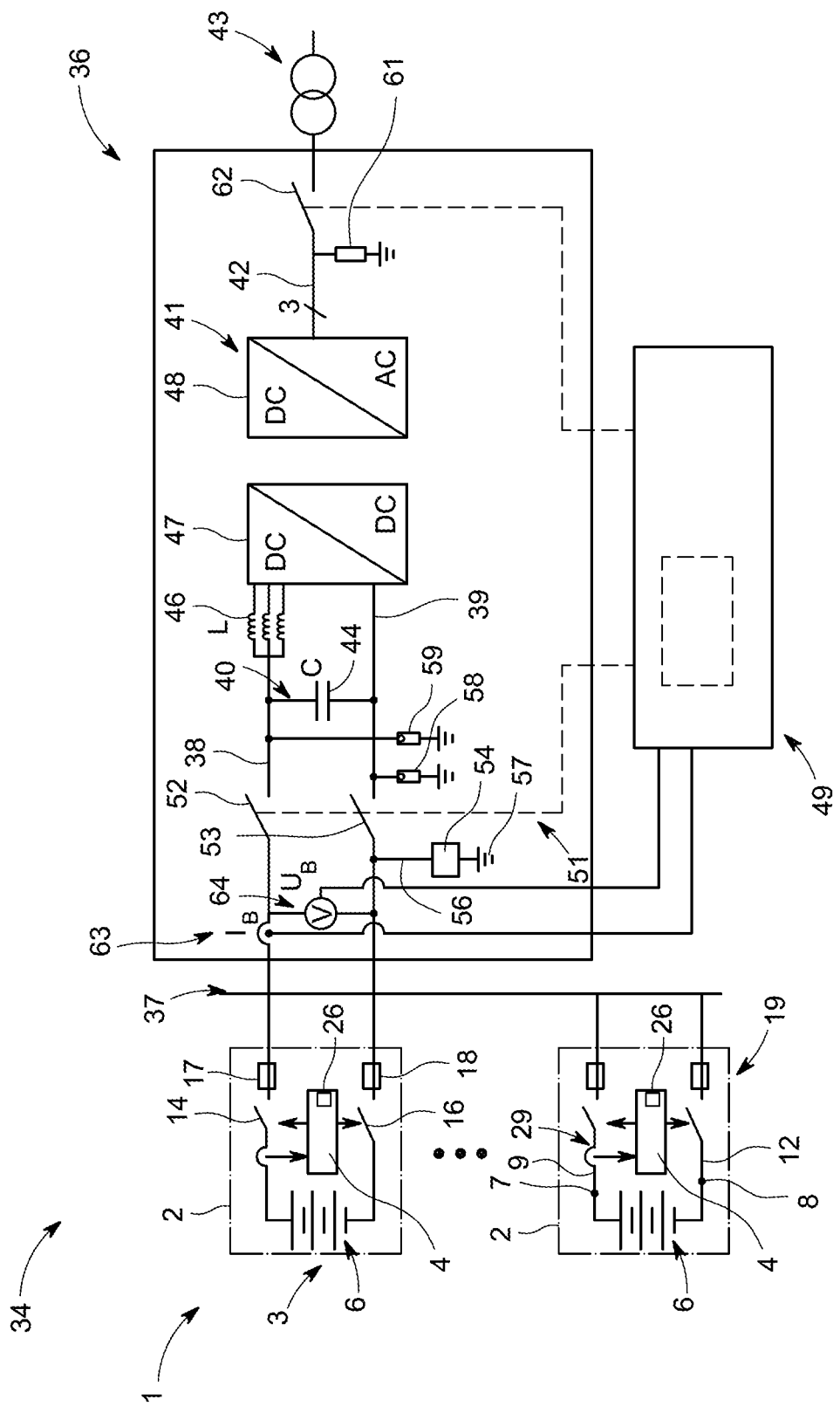
FIG. 2 a block circuit diagram of an energy conversion system based on a battery energy storage system in accordance with an embodiment of the present invention, in a simplified representation.

FIG. 2 shows an application of the inventive battery energy storage system 1 in an energy conversion system 34. The energy conversion system 34 can be used in conjunction with an energy generating system, an energy supply or distribution system, in particular a system that is based on renewable energy carriers such as the sun, wind or water in order to temporarily store renewable energy in the battery energy storage system and utilize it at other times, e.g., during the night, in photovoltaic plants or, during periods of no wind in wind turbines. Furthermore, the energy conversion system 34 allows a balancing of a fluctuating energy supply, a peak smoothing and a load balancing which can improve network stability and quality.

In essence, the energy conversion system 34 comprises a battery energy storage system such as, e.g., the battery energy storage system 1 as in FIG. 1, and a converter device 36 that is connected to the battery energy storage system 1. In this case, the battery energy storage system 1 comprises several battery modules 2 that are connected in parallel to a shared battery DC bus 37, wherein the number of battery modules 2 is a function of the respective application. For example, the application in battery energy storage power plants may comprise 50 to 300 parallel-connected modules that deliver a total nominal output of in an embodiment at least 0.5 MW, more particularly 1.0 MW or more.

The converter device 36 is intended to convert the input-side DC voltage energy that is delivered by the battery assembly 3 comprising the totality of the battery modules 2 into output-side AC voltage energy to be fed into a network or for the supply of consumers or, vice versa, to convert AC voltage energy from an output-side connected network (not shown) to an input-side DC voltage energy for storage in the battery energy storage system 1. The converter device 36 has connecting lines 38, 39 connected to the DC voltage bus 37, a converter assembly 41 and output-side lines 42 that lead out of the converter device 36.

The term "input side" or "on the input-side" relates to the side of the converter device 36 or the converter assembly 41 that is connected to the battery energy storage system 1, whereas the term "output side" or "on the output-side" relates to the other AC voltage side—remote from the battery energy storage system 1—of the converter device 36 or the converter assembly 41 that is connected—via the output lines 42, e.g., to the primary side of a transformer 43. On the secondary side, the transformer 43 is connected to a network, e.g., an energy supply or distribution network, and ensures the required voltage level adaptation.

The connecting lines comprise a positive connecting line 38 and a negative connecting line 39 that are connected parallel to each other to the battery DC bus and are otherwise connected via the intermediate DC voltage circuit (DC link) 40 to the input of the converter assembly 41. In this case, the intermediate DC voltage circuit 40 is represented by an intermediate circuit capacitor 44 that is connected between the connecting lines 38, 39, and an optional intermediate circuit inductor assembly 46 that is disposed to reduce the harmonic content in the input current of the converter assembly 41.

The converter assembly 41 comprises a DC voltage converter or DC-DC converter 47 whose input is connected to the intermediate DC voltage circuit 40, and a current converter or DC-AC converter 48 that is connected to the output of the DC-DC converter 47.

The DC-DC converter 47 comprises a circuit arrangement with electronic components such as transistors, in particular IGBTs, IGCTs, MOSFETs, thyristors and the like, that can be connected so as to convert one direct-voltage level into another. For example, in the event of a discharge of the battery energy storage system 1 for supplying a network or a consumer, the DC-DC converter 47 may act as a boost converter in order to raise the battery voltage $U_B$ delivered by the battery energy storage system 1 to a higher level that is suitable for the operation of the current converter 48. The current converter 48 that also comprises a circuit arrangement with controllable switch elements then acts as an inverter in order to convert the DC voltage energy applied to its input into the AC voltage energy on its output. In this case, the current converter 48 is shown as a three-phase inverter that is able to feed a three-phase alternating current into a low-voltage network via the output lines 42 or into a medium-voltage network via the transformer 43. Depending on the application, it is also possible to use a single-phase inverter instead of the three-phase DC-AC converter 48, or it is also possible to operate several three-phase inverters parallel to each other.

In case of a line current use for charging the battery energy storage system 1, the DC-AC converter 48 acts as a rectifier that takes alternating current energy from the net and converts it into direct-voltage energy, in which case the direct voltage can then be reduced via the DC-DC converter 47 acting as a buck converter to a lower level suitable for the battery energy storage system 1.

The converter device 36 described so far has been generally known so that additional details with regard to this and its functionality can be omitted. It is sufficient to mention that the operation of the converter device 36 is controlled by a control device 49 (indicated only schematically) that monitors operating parameters of the converter device 36 during operation and highly frequently activates the switches of the converters 47, 48 consistent with a predefined switching schematic in order to accomplish the respectively desired functions for feeding energy from the battery energy storage system 1 to a network and for removing energy from the network for the temporary storage in the battery energy storage system 1.

The energy conversion system 34 comprises a protection system 51 for the protection against damage due to short circuit and fault currents. The protection system 51 comprises a logic that is an integral part of the control device 49 and is not specifically shown here, said logic monitoring the voltages and currents in the energy conversion system or actively activating individual sections of the energy conversion system 34 in order to detect short circuit conditions and other fault conditions in order to disconnect the converter device 36 on the DC voltage side from the battery energy storage system 1 and/or on the AC voltage side from the net.

To accomplish this, the protection system 51 comprises circuit breakers 52, 53 that are inserted in the positive or negative connecting line in order to therewith interrupt a current flow through said lines, as required. The circuit breakers 52, 53 may also be opened for maintenance purposes in order to galvanically separate the converter device 36 from the battery assembly 3 for the protection of maintenance personnel.

Furthermore, the protection system 51 comprises a ground fault circuit interruptor 54 that is inserted in a ground connection between the (in this case) negative connecting line 39 and a grounding point 57, although the ground fault circuit interruptor 54 could, in principle, also be connected between the positive connecting line 38 and ground. In this case, the potential of the negative connecting line 39 is on ground potential during normal operation so that no current flows across the ground fault circuit interruptor. In the case of a ground connection, the internal fuse of the ground fault circuit interruptor triggers and interrupts the fault current path. Triggering of the ground fault circuit interruptor 54 is detected by the control device 49 of the energy conversion system 34, said control device then taking the converter device 36 completely out of operation.

Furthermore, the protection system 51 comprises overvoltage protectors 58, 59 and 61 that, here, are provided on the DC voltage side and/or on the AC voltage side of the converter device 36 for overvoltage protection. The overvoltage protectors 58, 59 and 61 may be varistors that are connected between the respective line 38, 39 and 42, respectively, and ground.

Furthermore, the protection system 51 comprises a circuit breaker 62 in each of the output lines 42, whereby said circuit breaker can be opened in a controlled manner by the control device 49 in order to disconnect the converter device 36 on the alternating current side or mains side for maintenance purposes, or in the event of a fault, in order to protect it against short circuits and other serious faults, or to prevent effects on the networks.

Other than that, the converter device 36 could comprise additional (not shown) fuses, including electronic fuses or safety fuses, on the DC voltage or AC voltage sides, these potentially offering additional protection in particular with very high short circuit currents or fault currents.

In addition, the protection system 51 also comprises the protection system 19 integrated in the battery energy storage system 1, said protection system ensuring, in the manner described in detail hereinabove, a battery protection in the case of internal battery faults and detecting—among other things—arc flash conditions by means of the overcurrent protection unit 32 and the undervoltage protection unit 33, and then opening the battery contactors 14, 16 of the faulty battery module 2 in order to take the defective module out of operation. To accomplish this, the arc flash protection device 26 is integrated in each battery management system 4 of each battery module 2. In order to avoid repetitions, reference is made to the explanations hereinabove in conjunction with FIG. 1.

Furthermore, FIG. 2 shows an alternative embodiment of an energy conversion system 34 in accordance with the invention. This embodiment is different from those described hereinabove in that the arc flash protection device is not integrated in each individual battery management system 4 of each battery module 2 but in the control device 49 of the converter device 36, as is indicated by block 26' (in dashed lines). The arc flash protection device 26' may be connected to the battery management system 4 of each battery module so as to be able to communicate and receive therefrom the corresponding current and voltage signals that are detected by the current sensor 29 and the voltage sensor 31 of a respective battery module 2. Alternatively, the arc flash protection device 26' monitors the voltage on the battery DC bus 37 or, as indicated, between the positive and the negative connecting lines 38, 39 by means of a voltage sensor 63, as well as the current fed by the battery energy storage system 1 by means of a current sensor 64, e.g., on the positive connecting line 38. Based on the signals delivered by the sensors 63, 64, the arc flash protection device 26' then detects—in the above illustrated manner—overcurrent or undervoltage conditions that characterize arc flash conditions in order to then take protective measures and disconnect the battery energy storage system 1 from the converter device 36. To accomplish this, the arc flash protection device 26'—if it is in communicative connection with the battery management systems 4 of the individual battery modules 2—instructs these to open the respective battery contactors 14, 16 or, instead, effect an interruption by the circuit breakers 52, 53. In the event of a fault, the arc flash protection device 26', as well as the arc flash protection device 26 according to FIG. 1, can also send an error message to an operator of the energy conversion system 34 or the like in order to draw the operator's attention to the fault situation.

The arc flash protection device 26' could also be arranged in a control device separate from the battery management system 4 and the control device 49 and in communicative connection with these at a more remote location, e.g., a remote control center.

Figure 3:
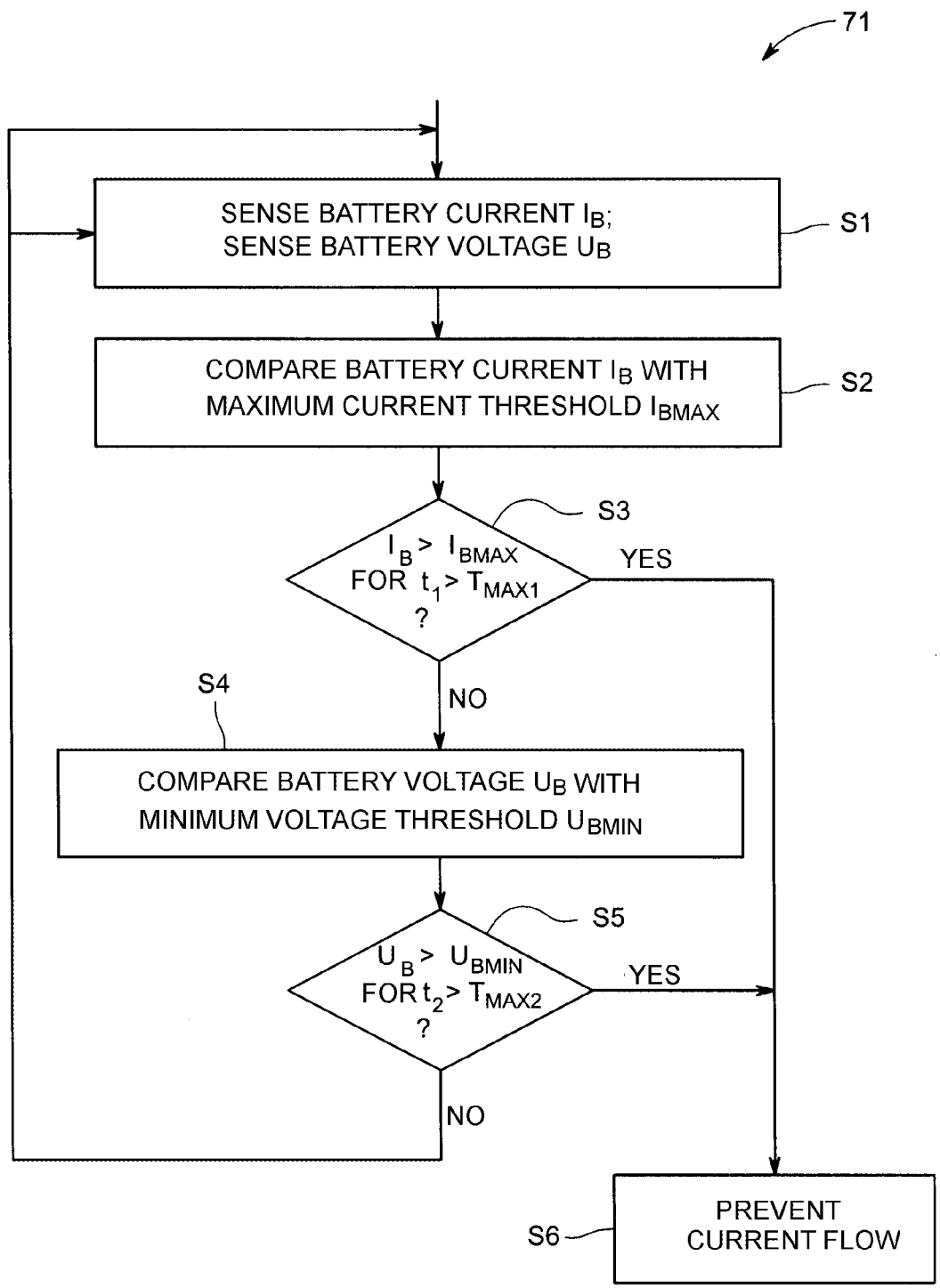
FIG. 3 a greatly simplified flow diagram of an inventive method for the protection of a battery energy storage system against the hazards due to arc flashes.

FIG. 3 shows a flow diagram of a method 71 for the protection of a battery energy storage system such as, e.g., the battery energy storage system 1 according to FIG. 1 or 2 that comprises a rechargeable battery assembly for the storage and provision of DC voltage energy against the hazards of arc flashing. The method comprises a step S1 according to which the battery current $I_B$ and the battery voltage $U_B$ are sensed. For example, the battery current and the battery voltage can be sensed by the current and voltage sensors 29, 31 integrated in the battery modules 2. Alternatively, the voltage on the battery DC bus 37 as in FIG. 2 or at another input of the system that is connected to the output terminals 11, 13 of the battery energy storage system 1, as well as a current delivered by the battery energy storage system 1, can be sensed.

In step S2, the sensed battery current $I_B$ is compared with a permissible maximum current threshold $I_{Bmax}$. If it is determined that the actual battery current $I_B$ is greater than the maximum current threshold $I_{Bmax}$ ($I_B > I_{Bmax}$), it is verified in step S3 whether or not a first time duration $t_1$, during which the condition $I_B > U_{Bmax}$ is applicable, is greater than the first maximum time threshold $T_{max}$ ($t_1 > T_{max1}$?). If this is not the case, the method continues with step S4. Otherwise it proceeds to step S6.

In step S4, the actual battery voltage $U_B$ is compared with a minimum voltage threshold $U_{Bmin}$ that characterizes an undervoltage limit in a fault situation with low impedance of the battery assembly. If it is determined that the actual battery voltage $U_B$ is less than the minimum voltage threshold $U_{Bmin}$ ($U_B < U_{Bmin}$), it is further verified in step S5 whether or not the second time duration $t_2$, during which the condition $U_B < U_{Bmin}$ is applicable, is greater than a second maximum time threshold ($t_2 > T_{max2}$?). If this is not the case, the method subsequently returns to step S1. Otherwise it proceeds to step S6.

In step S6, the method determines that arc flash conditions exist and it initiates protective measures in order to prevent a further operation of the battery assembly. This may include that the battery assembly is galvanically separated from the remaining system.

It is understandable that the steps illustrated hereinabove cannot be performed in a sequence other than the one indicated and can be partially performed simultaneously or in parallel and that additional steps can be integrated in the method in order to improve the detection of an arc flash hazard. Likewise, it is understandable that the battery energy storage system 1 in accordance with the invention can be used not only in conjunction with energy conversion systems such as, e.g., the energy conversion system 34 shown in FIG. 2, but that it can also be used in conjunction with any stationary or mobile systems for energy generation, energy supply and distribution, and also for electrical vehicles and the like. The battery energy storage system 1 can be used as a stand-alone system or be implemented as an integral part in another, higher-order stationary or mobile system.

What is claimed is:

1. A battery energy storage system, comprising:
   a battery assembly for storing and providing energy, wherein the battery assembly is rechargeable; and
   a protection system comprising an arc flash protection device for protection against hazards from arc flashes, wherein the arc flash protection device is arranged:
   to sense a battery current provided by the battery arrangement and to compare it with a predefined maximum current threshold,
   to sense a voltage provided by the battery assembly and to compare it with a predefined minimum voltage threshold, and
   if the sensed battery current is greater than the maximum current threshold and/or the sensed battery voltage is smaller than the minimum voltage threshold, to determine that arc flash conditions are present and to initiate protective measures to prevent further operation of the battery assembly.

2. The battery energy storage system according to claim 1, wherein the battery assembly comprises at least one battery module formed by a series connection of a plurality of battery cells.

3. The battery energy storage system according to claim 1, further comprising a positive DC voltage supply line connected to a positive terminal of the battery assembly and a negative DC voltage supply line connected to a negative terminal of the battery assembly, wherein the positive and/or negative DC voltage supply line each comprises a controllable switch arranged therein for interruption of the line connection as required.

4. The battery energy storage system according to claim 3, further comprising a fuse in the positive and/or negative DC voltage supply line for interruption of the current flow therethrough as required in case of a high short-circuit current.

5. The battery energy storage system according to claim 1, further comprising:
   a current sensor which senses the actual current currently provided by the battery assembly and provides a current signal representing the sensed actual current; and
   a voltage sensor which senses actual voltage currently provided by the battery assembly and provides a voltage signal representing the sensed actual voltage.

6. The battery energy storage system according to claim 1, further comprising a battery management system for monitoring and controlling the rechargeable battery assembly and comprising a control device for determining the state of charge of the battery assembly and for recognizing and preventing overcharge and over-discharge of the battery assembly.

7. The battery energy storage system according to claim 6, wherein the battery management system is connected to a current sensor and a voltage sensor of the battery energy storage system to receive from them signals representing present battery current and present battery voltage, and wherein the control device is arranged to compare the battery voltage signal received with a discharge voltage limit to recognize and prevent an over-discharged condition of the battery assembly.

8. The battery energy storage system according to claim 7, wherein the discharge voltage limit is higher than the minimum voltage threshold.

9. The battery energy storage system according to claim 6, wherein the arc flash protection device is part of the battery management system.

10. The battery energy storage system according to claim 1, wherein the arc flash protection device is arranged to measure a first time duration during which the sensed battery current is greater than the maximum current threshold and a second time duration during which the sensed battery voltage is smaller than the minimum voltage threshold and to initiate protective measures if the first time duration exceeds a first maximum time threshold and/or the second time duration exceeds a second maximum time threshold.

11. The battery energy storage system according to claim 10, wherein the first maximum time threshold is lower than the second maximum time threshold.

12. The battery energy storage system according to claim 10, wherein the second maximum time threshold is lower than a discharge time limit indicating the time period during which the battery voltage must be below the discharge voltage limit to ensure that an over-discharged condition of the battery assembly is recognized.

13. The battery energy storage system according to claim 1, wherein the arc flash protection device is arranged:
   to compare the sensed battery voltage with a predefined first minimum voltage threshold and with a predefined second minimum voltage threshold which is lower than the first minimum voltage threshold; and if the sensed battery voltage is below the first minimum voltage threshold for a first time period or if the sensed battery voltage is below the second minimum voltage threshold for a second period shorter than the first period, to initiate protective measures to prevent further operation of the battery assembly.

14. An energy conversion system, comprising:
a battery assembly for storing and providing energy, wherein the battery assembly is rechargeable;
a converter device connected to the battery assembly via a DC link for converting input side DC voltage energy provided by the battery assembly into output side AC voltage energy or vice versa; and
a protection system comprising an arc flash protection device for protection against hazards from arc flashes, wherein the arc flash protection device is arranged:
 to sense a battery current provided by the battery arrangement and to compare it with a predefined maximum current threshold;
 to sense a voltage provided by the battery assembly and to compare it with a predefined minimum voltage threshold; and
 if the sensed battery current is greater than the maximum current threshold and/or the sensed battery voltage is smaller than the minimum voltage threshold, to determine that arc flash conditions are present and to initiate protective measures to prevent further operation of the battery assembly.

15. The energy conversion system according to claim 14, wherein the battery assembly comprises a plurality of battery modules each having a plurality of battery cells connected in series, wherein the battery modules are connected in parallel to each other and to a common DC bus to which the DC link is coupled.

16. The energy conversion system according to claim 14, further comprising one or more of the following protection devices for protection against fault currents:
 a controllable switch in a positive and/or negative DC voltage supply line, which is connected to a positive and negative terminal of the battery assembly, respectively, to enable interruption of the current flow therethrough as required;
 a fuse in the positive and/or negative DC voltage supply line for interruption of the current flow as required in case of a high short-circuit current;
 a ground fault circuit interrupter in a ground connection between a positive or negative connecting line coupling the DC link with the positive and negative DC voltage supply line, respectively, and a grounding point;
 overvoltage protectors provided on the DC side and/or the AC side of the converter device for surge protection; and
 circuit breakers arranged in the connecting lines of the converter device on the DC side and/or the AC side to interrupt same as required.

17. The energy conversion system according to claim 14, further comprising a battery management system for monitoring and controlling the rechargeable battery assembly and comprising a control device for determining the state of charge of the battery assembly and for recognizing and preventing overcharge and over-discharge of the battery assembly.

18. The energy conversion system according to claim 17, wherein the arc flash protection device is part of the battery management system or is separate from the battery management system.

19. The energy conversion system according to claim 14, wherein the arc flash protection device is arranged to measure a first time duration during which the sensed battery current is greater than the maximum current threshold and a second time duration during which the sensed battery voltage is smaller than the minimum voltage threshold and to initiate protective measures if the first time duration exceeds a first maximum time threshold and/or the second time duration exceeds a second maximum time threshold wherein the first maximum time threshold is lower than the second maximum time threshold.

20. A method for protecting a battery energy storage system against hazards from arc flashes, wherein the battery energy storage system comprises a rechargeable battery assembly for storing and providing DC voltage energy, the method comprising:
 sensing a battery current provided by the battery assembly and delivering a battery current signal indicative thereof;
 comparing the battery current signal with a predefined maximum current threshold;
 sensing a battery voltage provided by the battery assembly and delivering a battery voltage signal indicative thereof;
 comparing the battery voltage signal with a predefined minimum voltage threshold; and
 in case that the battery current signal is greater than the maximum current threshold for a first minimum time duration and/or the battery voltage signal is smaller than the minimum voltage threshold for a second minimum time duration, determining that arc flash conditions are present and initiating protection measures to prevent further operation of the battery assembly.

* * * * *